3,473,946
METHOD OF ELECTROSTATICALLY COATING AN INSULATING SURFACE
Charles F. Roney, Huntington Beach, Calif., assignor to Bee Chemical Company, Lansing, Ill., a corporation of Illinois
No Drawing. Filed May 1, 1967, Ser. No. 634,906
Int. Cl. B05b 5/00; B44d 1/08, 1/52
U.S. Cl. 117—47                                   16 Claims

ABSTRACT OF THE DISCLOSURE

Insulating, non-conductive surfaces of articles are electrostatically coated with paint or other coating material by first applying a conductive coating containing phosphoric acid to the surface, and then electrostatically spraying a liquid coating over the phosphoric acid-containing coating. The second coating has dispersed therein a minor proportion of a basic salt-forming substance reactive with the phosphoric acid of the first coating. The adherence and other properties of the coatings are thereby improved.

BACKGROUND OF THE INVENTION

Electrostatic spraying processes for applying paints and other coatings have been in widespread use for many years. Electrostatic spraying may be carried out by either mechanically atomizing the paint and then depositing the atomized spray particles in an electrostatic field in order to increase the proportion of the spray particles which are deposited upon the article to be coated, or by atomizing under the influence of an electrostatic field and electrostatically depositing the spray particles. The present invention can be used with any electrostatic coating procedure, since it does not involve a modification of the spraying procedure itself, but rather a modification of the non-conducting surface and of the applied coating materials.

Electrostatic spraying of the surfaces of essentially non-conductive articles, such as those formed of plastics, glass, ceramics, wood, paper, etc., has presented the art with difficult problems. Since the electrostatic deposition process requires the maintaining of the surface being coated at a relatively opposite polarity to the electrostatic charge on the coating particles, insulating surfaces in some way must be made at least temporarily conductive for use of this process. With porous or absorbent non-conductive bodies, the application of water or other conducting liquid has been proposed, as described, for example, in United States Patent 2,723,921. For some articles, the insulating properties of the surfaces to be coated can be reduced and the surfaces made somewhat more conductive by heating the articles. Such a procedure is described in United States Patent 2,888,362.

More recently it has been proposed to apply an electrolyte pre-coat to the insulating surface, thereby forming a conductive film on the surface. The use of organic electrolytes for this purpose is described in United States Patent 3,236,679, and the use of inorganic electrolytes (specifically phosphoric acid), is described in United States Patent 2,992,139. Unfortunately, when the pre-coat contains a non-volatile electrolyte, whether organic or inorganic, the conductivity of the surface is improved at the expense of the quality of the coating. The electrolyte which separates the coating from the base material tends to substantially reduce the adhesion of the coating to the base material, thereby causing the coating to be more subject to damage by chipping, flaking, cracking, etc. Where the gloss or light reflectivity of the coating is desired, the electrolyte underlayer may have the effect of impairing the gloss, thereby reducing the attractiveness of the coating. These problems and the lack of a satisfactory solution thereto has proven particularly acute in the coating of articles formed from plastics, both thermoplastics and those formed from thermosetting resins. The use of water alone or heating to improve surface conductivity is not effective with plastics, and therefore it is necessary to employ an electrolyte pre-coat, which leads to all the problems just described. It will be appreciated that the pre-coat to achieve its object must form an electrically continuous conductive film over the surface and therefore the coating or paint layer is separated from the base material and cannot be brought into adherent contact therewith.

SUMMARY OF THE INVENTION

This invention is a further development of and an improvement on the electrostatic coating process described in United States Patent 2,992,139. As with the process of the cited patent, phosphoric acid is employed as the electrolyte in the initial coating material (the "pre-coat"), which coating material forms a conductive layer on the insulating surface. The phosphoric acid coating material can be applied as a dilute aqueous solution with or without other ingredients such as resins. It is the phosphoric acid which performs the essential function of increasing surface conductivity. If the aqueous phosphoric acid is applied to a surface on which it does not spread, as may occur with some plastics, a sufficient quantity of a wetting agent can be included to promote the spreading of the solution, thereby forming a substantially electrically continuous layer or film over the entire surface. Where the non-conductive surface is porous, such as for wood, the pre-coat can also contain resins or other surface sealing materials. The phosphoric acid pre-coat is preferably dried, as described in Patent 2,992,139. Also, as described in said patent, a second liquid spray coating is electrostatically applied over the film containing the phosphoric acid electrolyte. As distinguished from the process of the cited prior patent, however, the second coating is specially formulated or modified so that it is reactive with the phosphoric acid in the conductive pre-coat. Except for epoxy resin coatings which may contain amines reactive with epoxy resin, and which amines if present in a sufficient proportion can also be made reactive with the phosphoric acid, most coatings and paint must be specifically modified by the addition of a phosphoric acid reactive component. For example, a minor proportion of a basic salt-forming substance reactive with phosphoric acid is dispersed in the coating before it is applied. It will be understood that the reactive substance should be stable and compatible with the coating.

While a wide variety of reactive substances can be used in achieving the objects of the present invention, particularly good results have been obtained with organic amines. Another useful class of reactive substances is the polyvalent metal oxides. By incorporating these or other phosphoric acid reactive substances in the coating, the quality of the coating with respect to adherence, gloss, and other properties is substantially improved.

DESCRIPTION OF PREFERRED EMBODIMENTS

The electrostatic coating method of the present invention is applicable generally to articles or bodies which provide surfaces which are formed of essentially nonconducting materials, that is, materials which have such a low conductivity or high electrical insulating property that they cannot be readily and effectively coated by an ordinary electrostatic coating method. More specifically, the process is useful in coating surfaces formed from plastics, glass, ceramics, wood, paper, etc. The insulating surface to be coated may be porous and absorbent, or may be sealed or closed-surface. The process provides particular advantages in coating plastic surfaces.

As a preliminary and essential step in the process, the insulating surface to be coated is treated with a pre-coat, which contains phosphoric acid as the electrolyte. The phosphoric acid can be conveniently applied as an aqueous solution, the aqueous phosphoric acid being applied to the surface in such a way as to form a continuous conductive film. Any of the well-known techniques for applying solutions to surfaces can be used, such as dipping the article in the aqueous phosphoric acid, spraying the phosphoric acid solution, painting the solution on the surface by means of a brush or other applicator, or any other equivalent procedure. While the aqueous phosphoric acid can contain other ingredients, such as the resin components described in United States Patent 2,992,139, the initial coating material can consist essentially of aqueous phosphoric acid.

If the pre-coat solution does not wet or spread readily on the non-conductive surface, as may be the case when the surface is formed from certain plastics, a wetting agent can be included in the pre-coat solution to promote the spreading of the solution on the surface. The amount of the wetting agent to be used will be small, and it is not necessary to employ more than enough to modify the surface tension properties of the solution. For example, from .01 to 1% by weight based on the total solution can be used. The alkyl phosphoric or alkyl sulfuric acid wetting agents, such as dodecyl phosphoric acid or dodecyl sulfuric acid, are particularly desirable. Short chain alkyl phosphoric or sulfuric acids are not as desirable as those containing longer alkyl chains, such as alkyl chains of from 8 to 18 carbon atoms.

The concentration of the phosphoric acid in the aqueous pre-coat solution is not highly critical, especially where, as preferred, the coating is subjected to drying. In general, relatively dilute aqueous phosphoric acid solutions are preferred, such as those containing from 1 to 10% phosphoric acid by weight. By employing a dilute solution of the phosphoric acid, the distribution of the phosphoric acid in a thin film is assured. However, the phosphoric acid can be applied at any concentration, since the basic requirement is to form a conductive coating containing phosphoric acid.

While not essential, it is preferred to subject the pre-coat to drying to reduce its water content while leaving the phosphoric acid distributed on the surface. The drying step is particularly desirable where the phosphoric acid is applied as a dilute aqueous solution. No special drying procedure is required. The coated surface may be allowed to dry in contact with air at ordinary room temperature. If accelerated drying is desired, air may be circulated over the coated surfaces by means of a fan or blower, and, if desired, the air can be heated. Temperatures which would decompose the phosphoric acid or drive it off the surface should be avoided. Usually, there will be no advantage in heating the surfaces above 100° C., and in most instances drying temperatures of from 20 to 50° C. are satisfactory.

Following the application and drying of the phosphoric acid pre-coat, the surfaces can be electrostatically coated by standard procedures. The phosphoric acid film on the surfaces will render them sufficiently conductive to permit them to be maintained at a relative opposite polarity to the coating particles which are projected with an electric charge of either a positive or negative sign. The coating or paint may be mechanically atomized and deposited in an electrostatic field, or the atomizing itself may be carried out under the influence of an electrostatic field. One particularly suitable commercial electrostatic spray machine is known as the Ransburg No. 2, being manufactured and sold by Ransburg Electro-coating Corp., Indianapolis, Ind. Suitable electrostatic spray equipment and processes are also described in United States Patents 2,247,963 and 2,685,536. Commercially, the articles to be coated are usually passed on a continuous conveyor through an electrostatic deposition zone.

In combination with the steps previously described, this invention provides an improvement wherein a special reactive ingredient is incorporated in the coating or spray prior to the electrostatic deposition. From what has been said, it will be understood that the coating or paint is applied over the phosphoric acid film or layer. In accordance with the present invention, there is dispersed in the coating before application a minor amount compared with the coating solids of a basic salt-forming substance reactive with phosphoric acid while being compatible with the coating. Preferably, the reactive substance is a basic compound such as an organic amine or a polyvalent metal oxide or hydroxide. Particularly good results have been obtained with organic amines which are compatible with most coatings and paints. If the coating is of the epoxy resin type an organic amine may be included for reaction with the epoxy resin, and the same organic amine can be employed for reaction with the phosphoric acid pre-coat. Usually, however, it will be necessary to incorporate the reactive compound as a special ingredient. The ingredients of most coatings and paints are relatively inert and non-reactive with phosphoric acid.

The organic amine reactive with phosphoric acid can be a primary, secondary, or tertiary amine, but tertiary amines are preferred. The amine can be aliphatic or cyclic (aromatic). Short chain aliphatic amines are preferred, such as those containing from 1 to 6 carbons. Aliphatic amines containing up to 18 or 22 carbons might be used but are not as desirable. Polyamines, such as the diamines can be used, but mono-amines are satisfactory. One particularly desirable amine is methyl morpholine, which is a cyclic tertiary amine. Secondary cyclic amines, such as morpholine or pyridine, can also be used. Because of the general suitability of organic amines, it would unduly extend this application to list all amines. However, in addition to those already mentioned, other suitable amines include diethylene triamine, ethylene diamine, triethylene tetramine, tetraethylene, pentamine, 2-amino-2-methyl-1 propanol, diethyl amine, triethyl amine, etc. Aryl-substituted amines, viz., benzyl amine can also be used.

Polyvalent metal oxides can be used instead of or in addition to the organic amines. In general, it is preferred to employ a reactive component which reacts with the phosphoric acid to form a salt without evolving gas. If the coating sets before all of the gas escapes, gas bubbles may be trapped in the coating, thereby impairing its appearance. Since most polyvalent metal oxides react with phosphoric acid to form a salt without evolving gas, they are suitable in this respect. Other basic salt-forming substances, such as finely-divided polyvalent metals or polyvalent metal hydroxides are not as desirable, but can be used with some success in certain applications. Where the paint contains finely-divided metal particles, such as with aluminum paints, the metal can be employed as the special reactant. Highly reactive metals or their hydroxides, such as the alkali metals and hydroxides thereof, are not as desirable.

To assure effective reaction contact between the salt-forming substance and the phosphoric acid, the reactive substance should be in finely-divided form, and should be dispersed in the coating before application of the coating. Conveniently, the reactive substance can be incorporated in the coating as originally manufactured. The coating or paint will contain a solvent phase with the coating solids dissolved or dispersed therein. The reactive component can be either dissolved or dispersed in the solvent phase. Ordinarily, the coating as applied will comprise coating solids in a volatile liquid carrier, the carrier evaporating after application to leave the solids on the surface being coated.

The amount of reactive substance which can be incorporated is not critical providing a sufficient amount is available for reaction with the phosphoric acid. Usually, at least 0.5% by weight of the basic substance should be incorporated, the percentage being based on the coating solids before the addition of the reactive substance. Where the reactive substance is inert with respect to the other ingredients of the coating, or at least compatible therewith, there is no particular disadvantage in using an excess of the reactive substance. However, it will rarely be necessary or desirable to employ more than 5% by weight, or at most 10% by weight, of the reactive component based on the coating solids. Where the reactive subtance serves some purpose in addition to reacting with the phosphoric acid, higher concentrations can be used.

If desired, the percent of reactive ingredients to be incorporated in the coating or paint can be expressed on the basis of the total coating. This is quite acceptable where the coatings are applied in a standard manner. However, the solvent in the coating as it reaches the surface may vary with the manner of application, the solvent tending to evaporate more rapidly in spray application, for example, than in dip or brush application. While it is more difficult to specify generally applicable concentrations when based on the total coating, the objects of the present invention can usually be achieved by incorporating from 0.2 to 5% of the reactive substance based on the total coating as formulated for application. Usually, it will not be necessary to incorporate over 3% of the reactive substance based on the total coating. In the following examples, which further illustrate the invention, the percent of the reactive component is expressed on the basis of the total coating, but it will be understood that percentages can easily be converted to the coating solid basis if desired.

SPECIFIC EXAMPLES

Two coatings for phenolic moldings and one for thermoplastic moldings were selected. The two for phenolic moldings (Coatings Nos. 1 and 2), were thermocure enamels, and the one for thermoplastic surfaces (Coating No. 3), was a conventional acrylic finish. They were formulated as follows:

Coating No. 1

| Ingredients: | Parts by wt. |
|---|---|
| Titanium dioxide pigment | 100 |
| Oil-free phthalic alkyd of approximately 15 acid value at 50% solids in xylol (California Chemical Company—Chevron 1114) | 149 |
| Triazine formaldehyde resin of 50% solids in xylol and butanol (Rohm & Haas—MX-61) | 50 |
| Butyl Cellosolve | 40 |
| Toluene | 60 |

Coating No. 2

| Ingredients: | Parts by wt. |
|---|---|
| Titanium dioxide pigment | 75 |
| Thermosetting acrylic polymer with acid equivalent of 825 at 50% solids in xylol and Cellosolve acetate (Rohm & Haas—Acryloid AT-70) | 68 |
| Bisphenol A type expoxy resin of epoxy equivalent of 485 (Ciba—Araldite 7071) | 23 |
| Butyt Cellosolve | 20 |
| Cellosolve acetate | 20 |
| Toluol | 60 |

Coating No. 3

| Ingredients: | Parts by wt. |
|---|---|
| Titanium dioxide pigment | 15 |
| Thermoplastic acrylic copolymer consisting of 20% ethyl acrylate and 80% methyl methacrylate at 40% solids in toluol | 15 |
| Diacetone alcohol | 10 |
| Xylol | 15 |
| Toluol | 60 |

Samples were prepared by adding 1 to 2.5% of the weight based on the total finish of a basic material reactive with phosphoric acid. These consisted of metal oxides or hydroxides and amines, as set out below in Table A. The amines were added at the rate of 1% and the metal oxides or hydroxides were used at 2.5%. Based on coating solids, these rates correspond, respectively, to about 1.6% and 4%.

A reactive conductive material composed of 99.5% phosphoric acid and ½% of dodecyl phosphoric acid was prepared. A 5% solution of this material in water was then prepared. Injection molded acrylic pieces and compression molded phenolic pieces were immersed into this solution; removed, drained and allowed to dry in air at room temperature for 30 minutes. The surfaces of these pieces had a resistance of 50,000 ohms per square.

These pieces were then electrostatically painted with the prepared finishes, using a Ransburg No. 2 coater unit. Coatings 1 and 2 were used on the phenolic surfaces, and Coating No. 3 on the acrylic surfaces. The pre-coated pieces were compared with pieces which were not pretreated with the phosphoric acid. The data as set out in Table A shows the value of the pre-treatment.

TABLE A

| Additive | Percent Loss in Gloss over Phosphoric Acid Pre-Coat | | |
|---|---|---|---|
| | Coating No. 1 | Coating No. 2 | Coating No. 3 |
| Control (None) | 17.0 | 11.0 | 14.5 |
| 2.5% Aluminum oxide | 0.0 | 8.5 | 0.0 |
| 2.5% Antimony oxide | 6.0 | 5.5 | 1.7 |
| 2.5% Zinc oxide | 2.5 | 2.3 | 0.0 |
| 2.5% Magnesium oxide | 36.0 | 7.0 | 2.5 |
| 2.5% Barium hydroxide | 26.0 | 6.7 | 1.3 |
| 1% 2 amino-2 methyl-1 propanol | 2.5 | 0.0 | 1.5 |
| 1% Diethyl amine | 0.0 | 0.0 | 0.7 |
| 1% Triethylamine | 0.0 | 0.0 | 0.0 |
| 1% Methyl morpholine | 0.0 | 0.0 | 0.0 |

The "loss in gloss" was measured by a Gardner Portable 60° Glossmeter, manufactured by Gardner Laboratory, Inc., Bethesda, Md. The results were calculated as:

Percentage loss in gloss =

$$100 \left( \frac{\text{gloss over clean surface} - \text{gloss over phosphoric acid}}{\text{gloss over clean surface}} \right)$$

While in the foregoing examples the phosphoric acid is applied as a dilute aqueous solution, other polar solvents can be substituted for the water, either in whole or in part. For example, the lower alcohols, such as methanol, ethanol, and isopropanol can be used. By way of a specific example, the pre-coat may be formulated as follows:

Pre-coat

| Ingredients: | Parts by wt. |
|---|---|
| Phosphoric acid | 4.00 |
| Methanol | 95.98 |
| Wetting agent | .02 |
| | 100.00 |

The foregoing pre-coat can be used in conjunction with a paint applied to Plexiglas or other plastic surfaces, formulated as follows:

Paint composition

| Ingredients: | Parts by wt. |
|---|---|
| Acrylic resin | 20 |
| Titanium dioxide | 15 |
| Toluol | 80 |
| Zinc oxide | 5 |
| | 100 |

In the foregoing paint composition the reactive component is the zinc oxide, which will react with the phosphoric acid in the pre-coat to form a zinc phosphate salt. The titanium dioxide is relatively inert with respect to the phosphoric acid.

While in the foregoing specification this invention has been described in relation to certain preferred embodiments thereof and many details have been set forth for the purpose of illustration, it will be apparent to those skilled in the art that the invention is susceptible to additional embodiments and that certain of the details described herein can be varied without departing from the basic principle of the invention.

I claim:

1. The method of electrostatically coating an insulating surface by first forming a conductive coating of phosphoric acid on said surface, and then electrostatically applying a second liquid coating over said phosphoric acid coating, said second coating comprising coating solids in a volatile liquid carrier, wherein the improvement comprises dispersing in said second coating before application at least 0.5% by weight based on the coating solids therein of a basic salt-forming substance reactive with phosphoric acid and compatible with said second coating.

2. The method improvement of claim 1 wherein said basic salt-forming substance is an organic amine.

3. The method improvement of claim 1 wherein said basic salt-forming substance is a polyvalent metal oxide.

4. The method improvement of claim 1 wherein said basic salt-forming substance is methyl morpholine.

5. The method improvement of claim 1 wherein said second coating has dispersed therein from about 1 to 5% by weight based on said coating solids of said basic salt-forming substance.

6. The method of electrostatically coating an insulating surface by first forming a conductive coating of phosphoric acid on said surface, and then electrostatically applying a second liquid coating over said phosphoric acid coating, said second coating comprising coating solids in a volatile liquid carrier, wherein the improvement comprises dispersing in said second coating before application at least about 0.5 to 10% by weight based on the coating solids therein of a basic salt-forming compound reactive with phosphoric acid without evolving gas, said compound being compatible with said second coating.

7. The method improvement of claim 6 wherein said basic salt-forming compound is an organic amine.

8. The method improvement of claim 6 wherein said basic salt-forming compound is a polyvalent metal oxide.

9. The method improvement of claim 6 wherein said basic salt-forming compound is methyl morpholine.

10. The method improvement of claim 6 wherein said second coating has dispersed therein from about 1 to 5% by weight based on said coating solids of said basic salt-forming compound.

11. The method of electrostatically coating surfaces of plastic articles, comprising applying a pre-coat to said surfaces, said pre-coat consisting essentially of an aqueous solution of phosphoric acid as an electrolyte and a wetting agent to promote the spreading of said solution on said surfaces, drying said pre-coat on said surfaces, thereby forming conductive films of phosphoric acid on said surfaces, and then electrostatically applying a liquid spray coating to said surfaces over said phosphoric acid films, said spray coating as applied consisting essentially of coating solids in a volatile liquid carrier and having dispersed therein at least 0.5% by weight based on the coating solids therein of a basic salt-forming substance reactive with phosphoric acid and compatible with said coating.

12. The method of claim 11 wherein said wetting agent is selected from the group consisting of the alkyl phosphoric and sulfuric acid wetting agents.

13. The method of claim 11 wherein said basic salt-forming substance is an organic amine.

14. The method of claim 11 wherein said basic salt-forming substance is a polyvalent metal oxide.

15. The method of claim 11 wherein said basic salt-forming substance is methyl morpholine.

16. The method of claim 11 wherein said spray coating has dispersed therein from about 1 to 5% by weight based on the coating solids of a basic salt-forming compound reactive with phosphoric acid without evolving gas.

References Cited

UNITED STATES PATENTS

| 2,723,921 | 11/1955 | Starkey | 117—93.4 X |
| 2,992,139 | 7/1961 | Arhart | 117—93.4 X |
| 3,236,679 | 2/1966 | Spiller et al. | 117—57 X |

RALPH S. KENDALL, Primary Examiner

J. H. NEWSOME, Assistant Examiner

U.S. Cl. X.R.

117—69, 93.4